United States Patent Office

Re. 27,240
Reissued Nov. 23, 1971

27,240

THERAPEUTIC PREPARATION OF IRON

Eric London, Fareham, Hampshire, and George Daniel Twigg, Goostrey, Cheshire, England, by Fisons Pharmaceuticals Limited, Loughborough, Leicestershire, England, assignee, assignors to Fisons Limited, Felixstowe, Suffolk, England

No Drawing. Original No. 2,820,740, dated Jan. 21, 1958, Ser. No. 412,405, Feb. 24, 1954. Reissue No. 24,642, dated Apr. 28, 1959, Ser. No. 765,693, Sept. 22, 1958. This application for reissue Oct. 7, 1969, Ser. No. 871,812

Claims priority, application Great Britain, Feb. 27, 1953,

Int. Cl. A61k *27/00*

U.S. Cl. 424—180 15 Claims

Matter enclosed in heavy brackets [ ] appears in the first reissue but forms no part of this reissue specification; matter printed in italics indicates the additions made by the first reissue; matter printed in bold face (except reference figures and claim numbers) indicates the additions made by this reissue

This invention relates to the manufacture of colloidal therapeutic preparations containing iron suitable for use in parenteral injection and of the type called generically "colloidal injectable iron preparation."

It is well-known that the so-called "saccharated oxide of iron" preparations can be used for injection purposes in the treatment of iron-deficiency anemia. These preparations consist essentially of aqueous solutions containing ferric hydroxide in colloidal form and stabilised by the presence of sugars (especially sucrose), of sugar mixtures, optionally modified by a preliminary heat-treatment, the components being admixed in the presence of a suitable alkali.

While such materials may be injected intravenously without toxic effects, they are found to be disadvantageous for intramuscular or subcutaneous injection, since, owing to the high osmotic pressure and the possible alkalinity of this type of solution, intramuscular injection usually results in considerable pain and inflammation at the site of the injection, even when sub-therapeutic doses are administered. The unsuitability of such products for intramuscular injection is rendered even more obvious by the fact that they are not absorbed appreciably when injected by this route.

It is considered desirable for an iron solution intended for intramuscular injection to be able to satisfy the following requirements:

(a) No effect of the pH of the body fluids;
(b) Isotonicity with the tissue fluid;
(c) Stability in presence of protein and electrolytes;
(d) Ready availability for haemoglobin synthesis;
(e) Rapid absorption coupled with a low rate of excretion;
(f) Maximal iron content in minimal volume, i.e. 3 to 5% elemental iron in solution;
(g) low toxicity;
(h) Reproducibility;
(i) Stability on storage.

The principal object of our invention is to provide more particularly for the treatment of iron-deficiency anemia a colloidal iron preparation, which is especially suitable for intramuscular injection (although adaptable also for intravenous use) and is well-tolerated without the onset of undesirable local or general side-effects. A further object is to obtain an iron-containing colloid, essentially free from iron ions, which can be administered in dosage adequate for producing the required therapeutic response and from which the iron is absorbed rapidly into the circulation with absence of untoward systemic reactions, e.g. vasodilation, headache, lumbar pain, vomiting and loss of consciousness.

With the foregoing objects in view, the present invention provides a therapeutically effective iron preparation consisting essentially of a colloidal substantially non-ionic ferric hydroxide-partially depolymerized dextran complex, believed to be novel in itself. A colloidal iron preparation may be produced according to the invention by reacting, with such heating as may be necessary, a solution of a partially depolymerized dextran, a solution of suspension of a ferric compound (which expression covers for example the ferric compounds hereinafter specified or a mixture of ferric compounds), together with alkali, to form a colloidal solution from which any undissolved matter may be separated and whose pH is or, if necessary, is adjusted to between 4.0 and 11.0 within which range the preparation appears to be capable of retaining its stability in water for reasonable periods of time. However, the pH of the preparation for injection may be, or if necessary, may be adjusted to between 5.5 and 8.5 and preferably 6.5.

In carrying out this method, the partially depolymerized dextran may either be dissolved in the solution or suspension of the ferric compound with subsequent addition of the alkali, or alternatively, the dextran can be dissolved in the alkali, to which the ferric compound in solution or suspension is then added.

Though the molecular structure of the product is not yet known with certainty, and it can therefore be defined only in empirical terms, our parenteral iron preparation may possibly consist of an aqueous solution of colloidal ferric hydroxide complexed with enough of the partially depolymerized dextran to stabilise the solution satisfactorily for the purpose of injection but not so much ferric hydroxide as to require an excess of the dextran over the requirements of such injection in other respects, e.g. as regards the consistency of the solution. If the iron content is excessive, the amount of the dextran needed to stabilise it is so great that the resultant high viscosity of the product renders it unsuitable for use as a parenteral iron preparation and a minimum dextran:iron ratio exists below which the iron can no longer be stabilised so as to be suitable for an injection.

The partially-depolymerized dextran which we use as a starting-material is derived from raw dextran obtained according to known methods by growing under carefully-controlled conditions of temperature, appropriate organisms, especially Leuconostoc mesenteroides, syn. Betacoccus arabinosaceous in a suitable nutrient medium containing a high proportion of sucrose. It is further known that the highly polymerised raw dextran gives rise on partial degradation as, for example, by treatment with dilute mineral acid, to simpler polymeric forms from aqueous solutions of which (being polydisperse), fractions of different average molecular weight can be precipitated by adding a suitable water-miscible organic liquid, such as methyl alcohol, ethyl alcohol or acetone. These degradation products consist of polymerised glucose residues, joined predominantly by $\alpha-1:6$ and, to a lesser extent, by $\alpha-1:4$ linkages.

A fraction of this kind is suitable as a starting-material for the purpose of our invention, but the molecular range of the partially depolymerized dextran is selected from the standpoint of the physical characteristics such as intrinsic viscosity, of the solution containing the minimum concentratiin of the dextran needed to ensure continued stability of the parenteral iron solution, rather than from the customary one of the physiological effects of the dextran itself, which are here of secondary importance.

In the present context the intended meaning of intrinsic viscosity is the limiting value of specific viscosity divided by concentration at infinite dilution measured by the following method. The "flow time" of at least three solutions of different concentrations (all less than 5% w./v. dextran) is determined in an Ostwald viscometer. The flow time of the solution divided by the flow time for water at the same temperature, gives the relative viscosity of the dextran solution at the given concentration. The specific viscosity of a dextran solution at a given concentration is obtained by subtracting 1.0 from the value for relative viscosity. For each concentration of dextran solution, the factor (specific viscosity divided by concentration) is calculated and this factor is plotted against the percentage concentration of the solution from which it was obtained. By extrapolating the graph obtained to zero concentration, the limiting value of the factor (specific viscosity divided by concentration) is obtained. This value is known as the intrinsic viscosity of the material in solution. Due to the fact that the fractions of dextran described are polydisperse, the term average intrinsic viscosity is used.

To avoid any possible misinterpretation, the term "average intrinsic viscosity" refers to the dextran itself and not to an aqueous solution of dextran, or an aqueous solution of the ferric hydroxide-dextran complex.

We have found that stable iron solutions can be prepared from fractions of dextran of intrinsic viscosity ranging from 0.025 to 0.5; but the quantity of iron stabilised per unit weight of dextran decreases as the intrinsic viscosity of the dextran colloid increases. The iron content of a solution considered to be adequate for parenteral injection is at least 2% and our investigations have shown that, in order to obtain a stable preparation which possesses clinical utility the dextran selected as a starting-material must have an upper limit of intrinsic viscosity which does not appreciably exceed 0.2 and which more particularly has an intrinsic viscosity in the range from about 0.025 to about 0.25 at 25° C. A therapeutically-useful preparation containing from 3 to 5% elemental iron (corresponding to from 6 to 10% ferric hydroxide) can be obtained from a fractionated dextran with an intrinsic viscosity of 0.03 to 0.06, when the partially depolymerized dextran content is approximately 30 to 50%.

The colloidal ferric hydroxide may be formed in presence of the partially depolymerized dextran by heating a suitable water-soluble ferric salt and the dextran together in aqueous solution with excess of alkali.

Suitable ferric compounds comprise: (i) water soluble ferric salts such as the chloride, nitrate, sulphate or acetate and double salts such as ferric ammonium sulphate, or their obvious chemical equivalents; (ii) ferric oxy-salts prepared by dissolving ferric hydroxide in a solution of a ferric salt; dialysed iron solution B.P.C. and freshly-precipitated washed ferric hydroxide; (iii) any ferric compound which, when rendered alkaline in the presence of dextran, gives rise to ferric hydroxide.

The alkali of choice for the purpose of this invention is sodium hydroxide, but other suitable alkalis comprise the hydroxides of lithium, potassium and ammonium; the carbonates of lithium, sodium and potassium and their obvious chemical equivalents.

Stable preparations appropriate for intramuscular injection can also be obtained according to our invention from ferric citrate, ferric ammonium citrate and ferric glycerophosphate, but in these instances we have shown it to be desirable definitely to use a caustic alkali, for example, sodium hydroxide, as the agent for rendering the mixture alkaline during the preparation thereof.

We have further found that our novel colloidal injectable iron preparations can be purified from the electrolytes which are formed simultaneously as by-products by utilising either of the following techniques:

(i) Subjecting a preparation according to the invention to dialysis against running water until the desired osmotic pressure has been obtained;

(ii) Mixing a preparation according to the invention with a suitable water-miscible solvent such as methyl alcohol, ethyl alcohol or acetone in quantity sufficient to separate the colloid, separating the latter from solution and re-dissolving it in distilled water to the required concentration.

It sometimes happens that a parenteral iron preparation obtained by the improved process is slightly hypotonic; thus the freezing-point depression of a colloidal solution containing about 5% elemental iron, as normally prepared for intramuscular injection, is frequently less than 0.53° C. (the approximate depression obtained with isotonic saline): in such a case, a suitable amount of an appropriate substance such as sodium chloric or glucose may be added to raise the freezing-point depression value of the preparation to 0.53° C. and thereby render it substantially isotonic with blood.

If the pH of a colloidal iron preparation in accordance with our invention falls outside the range 5.5 to 8.5, there can be added, prior to sterilization, sufficient acid or alkali, as the case may be, to ensure that a pH value falling within these limits, and preferably 6.5, is finally attained for clinical use.

Sterilization of the preparation made in accordance with the present invention can be effected by autoclaving the said preparations in their final containers, as, for example, ampoules, for 30 minutes at a steam pressure of 10 lbs. per square inch, corresponding to a temperature of 115° C.

When colloidal solutions prepared in accordance with our invention are dehydrated as, for example, by evaporation under reduced pressure or, alternatively, by the separation and subsequent desiccation of the product obtained on precipitating the colloid by adding a suitable water-miscible solvent such as methyl alcohol, ethyl alcohol or acetone, there can be obtained solidified preparations suitable for the immediate reconstitution of colloidal injectable iron solutions by the addition of distilled water.

Tested for intravenous toxicity in mice, a preparation obtained according to our investigation may show an $LD_{50}$ value in excess of 600 mg./kilo: this result compares most favourably with a commercial saccharated oxide of iron preparation which, when tested under similar conditions, indicated an $LD_{50}$ of 300 mg./kilo.

On injecting a colloidal parenteral iron preparation made in accordance with this invention into mice by the intramuscular route it has not been found possible to administer a dosage sufficiently large to kill any of the test animals (mice or rats) using the highest practical intramuscular dosage of the material, viz: 5 mls./kilo (corresponding to 250 mgms. Fe/kilo).

The following are examples by way of illustration only of preparations in detail according to the invention:

EXAMPLE 1

To 25 g. partially-depolymerized dextran (intrinsic viscosity: 0.07), dissolved in water (50 ml.), was added sodium hydroxide (15 g.) in water (25 ml.), followed by 40 ml. of 30% w./v. aqueous ferric chloride. The mixture was heated to boiling for about 15 minutes and allowed to cool to room temperature. The solid that remained undissolved was then removed by centrifugation and the solution dialysed against running water for approximately 24 hrs., using tubing made of material known under the registered trademark cellophane. The dialysed solution was concentrated under reduced pressure to yield a clear, stable solution containing the equivalent of 4.15% elemental iron. The product was again filtered and sterilised by autoclaving at a steam pressure of 10 lbs. per square inch for 30 minutes, its final pH value being 6.8. The preparation was found to have a freezing-point depression of 0.18° C., compared with pure water, which on addition of 0.6% w./v. aqueous sodium chloride, was raised to 0.60° C.

This material when tested for intravenous toxicity in mice gave an $LD_{50}$ value of approimately 800 mg./kilo.

EXAMPLE 2

To 25 g. partially-depolymerised dextran (intrinsic viscosity: 0.05) dissolved in water (50 ml.) was added sodium hydroxide (15 g.) in water (25 ml.), followed by ferric citrate (22 g.) in water (200 ml.). The mixture was heated for approximately 2 hrs. at 65° C., with stirring and the resultant dark red solution was filtered and cooled. The filtrate was stirred with 95% ethyl alcohol and the treacly precipitate separated, prior to its being redissolved in about 1 litre distilled water. From this aqueous solution, the material was again precipitated under the same conditions, to be once more dissolved in distilled water. The filtered aqueous solution was evaporated under reduced pressure at 45° C., until the solution contained 5% Fe, as determined by assay.

*EXAMPLE 3*

*400 g. of dextran having an intrinsic viscosity of 0.04, and 103 g. of anhydrous sodium carbonate are dissolved in 800 ml. of hot water. This solution is cooled and to it 400 ml. of a solution of ferric chloride (containing 100 g. $FeCl_3$) is added with stirring. After the liberated carbon dioxide has escaped, the resulting solution containing colloidal ferric hydroxide stabilized with dextran and also sodium chloride produced during the reaction, is dialysed against water, using, for example, cellophane as a membrane. When its sodium chloride concentration has in this way been reduced to about 0.2%, the solution is concentrated under atmospheric pressure until the volume is reduced to about 600 ml. The preparation is then adjusted to a 5% content of iron and sterilized by autoclaving in the final containers.*

We claim:

1. A composition comprising a substantially non-ionic complex of ferric hydroxide with a dextran having an average intrinsic viscosity at 25° C. of about 0.025 to about 0.25, said complex being stable in contact with water.

2. A therapeutic composition comprising a stable aqueous solution of a substantially non-ionic complex of ferric hydroxide with a dextran having an average intrinsic viscosity at 25° C. of about 0.025 to about 0.25.

3. A composition comprising a substantially non-ionic complex of ferric hydroxide with a dextran having an average intrinsic viscosity at 25° C. of about 0.03 to 0.06, said complex being stable in contact with water.

4. A therapeutic composition for treating iron deficiency anemia comprising a non-toxic, sterile, colloidal aqueous solution of a substantially non-ionic complex of ferric hydroxide with a dextran having an average intrinsic viscosity at 25° C. of about 0.025 to about 0.25, said solution having a pH of about 4 to about 8.5.

5. A composition according to claim 4 having at least 2% elemental iron.

[6. The process which comprises parenterally administering to an animal a therapeutic amount of a substantially non-ionic complex of ferric hydroxide with a dextran having an average intrinsic viscosity at 25° C. of about 0.025 to about 0.25.]

[7. The process of claim 6 in which the parenteral administration is intramuscular.]

[8. The process of preparing a substantially non-ionic colloidal ferric hydroxide-dextran complex which comprises combining, in contact with water, a dextran having an average intrinsic viscosity at 25° C. of about 0.025 to about 0.25 with ferric hydroxide, said ferric hydroxide being formed in situ in contact with the dextran by a double decomposition reaction between an ionizable ferric salt and an alkali base.]

[9. The process of claim 8 in which the resulting ferric hydroxide-dextran complex in water is dialyzed to remove electrolytes.]

[10. The process of claim 8 in which the pH is adjusted to the range from about 4 to about 8.5.]

[11. The process of claim 8 in which the resulting ferric hydroxide-dextran complex is purified by precipitation with a water miscible solvent, the precipitate is separated, and redissolved in water.]

12. A composition comprising a substantially nonionic complex of ferric hydroxide with a dextran having an average intrinsic viscosity at 25° C. of about 0.03 to 0.06, said complex containing at least 2% elemental iron, and being stable in contact with water.

*13. A therapeutic composition in a final sterilized container for treating iron deficiency anemia, said therapeutic composition comprising a substantially non-ionic complex of ferric hydroxide with a dextran having an average intrinsic viscosity at 25° C. of about 0.025 to 0.25, said complex being stable in contact with water.*

*14. An ampoule containing a therapeutic composition for treating iron deficiency anemia, said therapeutic composition comprising a non-toxic, sterile, colloidal aqueous solution of a substantially non-ionic complex of ferric hydroxide with a dextran having an average intrinsic viscosity at 25° C. of about 0.025 to about 0.25, said solution having a pH of about 4 to about 8.5.*

*15. The process which comprises intramuscularly administering to an animal a therapeutic amount of a substantially non-ionic complex of ferric hydroxide with a dextran having an average intrinsic viscosity at 25° C. of about 0.025 to about 0.25.*

*16. A therapeutic composition comprising a substantially non-ionic complex of ferric hydroxide with a dextran in a final sterilized container for treating iron deficiency anemia in animals, said dextran having an average intrinsic viscosity at 25° C. of about 0.025 to 0.25, said complex being stable in contact with water.*

*17. A therapeutic composition comprising a substantially non-ionic complex of ferric hydroxide with a dextran in an ampoule for treating iron deficiency anemia in animals, said dextran having an average intrinsic viscosity at 25° C. of about 0.025 to 0.25, said complex being stable in contact with water.*

*18. A therapeutic composition comprising a substantially non-ionic complex of ferric hydroxide with a dextran having an average intrinsic viscosity at 25° C. of about 0.025 to 0.25, said complex being stable in contact with water and having clinical use for treating iron deficiency anemia with the absence of untoward systemic reactions, such as headaches, and lumbar pain.*

*19. A therapeutic composition comprising a substantially non-ionic complex of ferric hydroxide with a dextran in a final sterilized container, said dextran having an average intrinsic viscosity at 25° C. of about 0.025 to 0.25, said complex being stable in contact with water and having clinical use for treating iron deficiency anemia with the absence of untoward systemic reactions, such as headaches, and lumbar pain.*

*20. A therapeutic composition comprising a substantially non-ionic complex of ferric hydroxide with a dextran in an ampoule, said dextran having an average intrinsic viscosity at 25° C. of about 0.025 to 0.25, said complex being stable in contact with water and having clinical use for treating iron deficiency anemia with the absence of untoward systemic reactions, such as headaches, and lumbar pain.*

*21. A therapeutic composition for treating iron deficiency anemia, comprising a substantially non-ionic complex of ferric hydroxide with a dextran having an average*

*intrinsic viscosity at 25° C. of about 0.03 to 0.06, said complex being stable in contact with water and containing about 5% elemental iron.*

References Cited

The following references, cited by the Examiner, are of record in the patented file of this patent or the original patent.

UNITED STATES PATENTS

| | | |
|---|---|---|
| 2,518,135 | 8/1950 | Gaver. |
| 2,572,923 | 10/1951 | Gaver. |
| 2,609,368 | 9/1952 | Gaver. |

OTHER REFERENCES

Zief et al.: J.A.C.S. Apr. 20, 1952 pp. 2126–7.

Manufacturing Chemist, vol. 23:2 February 1952, pp. 49–54.

Physician's Bulletin, May 1952 pp. 41–44.

SAM ROSEN, Primary Examiner

U.S. Cl. X.R.

424—147

PO-1050
(5/69)

UNITED STATES PATENT OFFICE
CERTIFICATE OF CORRECTION

Reissue
Patent No. Re. 27,240 Dated November 23, 1971

Inventor(s) Eric London and George Daniel Twigg

It is certified that error appears in the above-identified patent and that said Letters Patent are hereby corrected as shown below:

Column 3, line 4, "concentratiin" should be --concentration--

Claims 13 through 21 should be printed in bold face to indicate the additions made by this reissue.

Signed and sealed this 2nd day of May 1972.

(SEAL)
Attest:

EDWARD M.FLETCHER,JR.
Attesting Officer

ROBERT GOTTSCHALK
Commissioner of Patents